Figure 1:
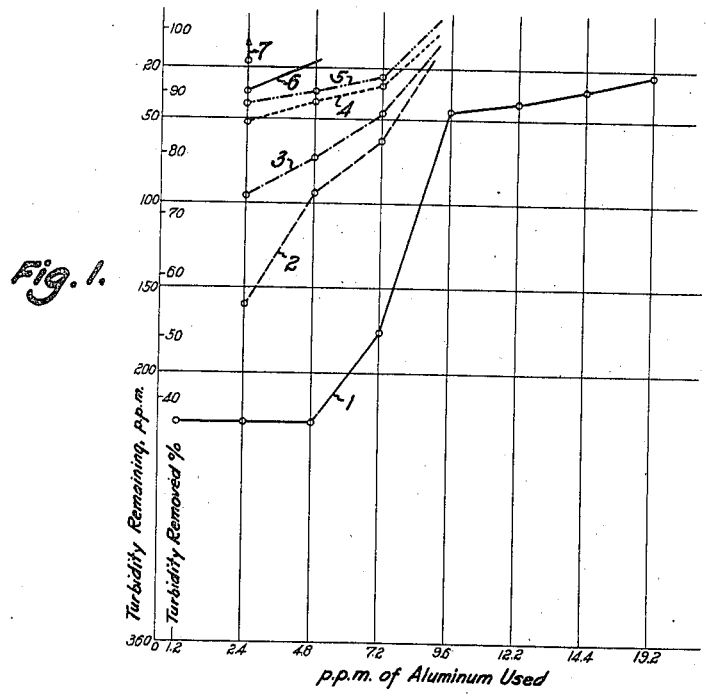

Feb. 23, 1943.   E. A. SLAGLE   2,312,198
COAGULANT AND METHOD OF MAKING SAME
Filed June 28, 1940

Inventor:
Edgar A. Slagle
By Potter, Pierce & Scheffler
his Attorneys.

Patented Feb. 23, 1943

2,312,198

UNITED STATES PATENT OFFICE 2,312,198

COAGULANT AND METHOD OF MAKING SAME

Edgar A. Slagle, North Plainfield, N. J., assignor to Research Corporation, New York, N. Y., a corporation of New York Application June 28, 1940, Serial No. 343,049

6 Claims. (Cl. 23—50)

The present invention relates to a new composition of matter, a method of making said composition, and applications of the composition to uses involving coagulation phenomena.

More in particular the invention relates to a composition which comprises aluminum, sulphate radicals, hydroxyl radicals, and chlorine in such relationship that the composition is very effective as a coagulant for removing finely divided constituents from aqueous systems such as domestic sewage, trade wastes, and water supplies.

The invention has as a primary purpose, the manufacture of such a composition from readily obtainable and cheap materials in simple and economical manner.

An important object of the invention is to provide simple and easily carried out procedures whereby said composition can be effectively used in problems involving coagulation.

Compositions of matter containing aluminum—common alum or aluminum sulphate, is particular, have been used as mordants and in water purification for hundreds of years. But only recently has serious study been made of the physical and chemical structure of these compositions in efforts to understand the mechanism by which they produce coagulation of dispersed particles. It is agreed that when an aluminum salt is dissolved in water, at least portions of the salt become electrically charged, that is, ionized. The ions may be individually dissolved particles, or components of a lattice work, or they may agglomerate to such size that the particles can be seen with a powerful microscope and are said to compose a "sol." Furthermore, hydrolysis takes place to more or less degree when most aluminum salts are dissolved in water and the dissolved or liquid dispersed material may be quite different in chemical composition from the salts themselves. Chemists and physicists of prominence, using the X-ray, refractometers and other analytical tools useful in molecular structure investigations, have studied the ions or particles which result from dissolving or dispersing such compounds in water. But they have not been in agreement on the physical structure and chemical composition of the ions. This lack of agreement is referred to here to explain my inability completely to describe my product in dry form, and in concentrated and in dilute solution, with the pertinent knowledge now available. I would point out that the dissolved material has to be considered not by itself but as associated with the media in which it is dssolved and to which it owes its ionzed or electrical characteristics.

In the present invention, commercial alum $Al_2(SO_4)_3.18H_2O$ was chosen as a source of aluminum because of its low price and because it is generally available. But used as such, say in the treatment of sewage, the floc formed is small and light and demands a long settling period under quiescent conditions for gravity sedimentation. The sludge formed by alum treatment does not compact well. It is bulky, voluminous and is apt to interfere with proper operation of sludge digestion tanks. I appreciated the need of altering the alum so that the resulting product when added to a dispersed system, such as domestic sewage, would bring about more effective coagulation and more rapid sedimentation. After much study and experimentation, I found that a composition made by adding calcium chloride to a solution of alum and then adding sodium carbonate to the resulting products of the first reaction gave novel and very useful results when used as a coagulant.

The proportions in which these ingredients are combined can vary but for practical and theoretical reasons the following combining weights are recommended:

Combination A

| | | |
|---|---|---|
| Alum, $Al_2(SO_4)_3.18H_2O$ | pounds | 666 |
| Calcium chloride, flake, $CaCl_2.2H_2O$ | do | 147 |
| Soda ash, powdered, $Na_2CO_3$ | do | 106 |
| Water, in which the alum is first dissolved | gallons | 200 |

It will be noticed that these weights (except that of the water) correspond to the molecular weights of the several ingredients and such a combination will be referred to hereinafter as a 1-1-1 combination. From analysis of the products formed, it is believed that the ingredients combine according to the following formulas:

$$Al_2(SO_4)_3 + CaCl_2 \rightarrow Al_2(SO_4)_2Cl_2 + CaSO_4 \quad (I)$$

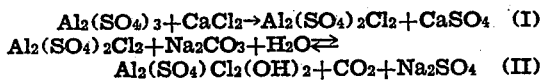

$$Al_2(SO_4)Cl_2(OH)_2 + CO_2 + Na_2SO_4 \quad (II)$$

The aluminum salt, $Al_2(SO_4)Cl_2(OH)_2$, is believed to be the compound responsible for the valuable results that the combination of the above mentioned ingredients provide and is the basis of the present invention.

A previous effort to improve the coagulating properties of alum by replacing a sulfate group by hydroxyl groups, e. g. by treating the alum with sodium carbonate, was not regarded as being successful because the resulting basic aluminum sulfate was little if any better as a coagulant than the alum itself. I conceived the idea of replacing a sulfate group of the alum by chlorine and brought about this result by reacting the alum with calcium chloride. This gave a rather good coagulant, i. e. the compound or composition of the probable formula $Al_2(SO_4)_2Cl_2$ but I then found that whereas replacement of $SO_4$ by OH in the alum was substantially ineffective, the replacement of $SO_4$ by OH in the aluminum sulfate chloride gave a product which is greatly superior to alum in its coagulating properties.

I have established moreover that in making the aluminum chloro hydroxy sulfate compound or composition, starting with alum, it is necessary to introduce the chlorine first and then the hydroxyl groups, i. e. it is necessary to react the alum first with the calcium chloride and then with the sodium carbonate. The reverse order of treatment, i. e. first reacting the alum with sodium carbonate and then with calcium chloride will not yield the same product.

Another factor which was found to be essential in making the product is the combining of the ingredients in concentrated solutions so that hydrolysis does not occur. Hydrolysis appears to be an important factor in bringing about coagulation of suspended particles but I am careful to have this occur in situ, that is, in the liquid to be clarified, i. e. in the immediate vicinity of the particles themselves. The product of the invention is made by adding alum to a limited amount of water (1.5 to 3.5 lb. of water per pound of alum) and adding flake calcium chloride and dry soda ash separately and in sequence to the alum solution. By this procedure only one solution is made, and one tank used. For example, a commonly made solution of a 1-1-1 combination, after evolution of the $CO_2$ but retaining the precipitated $CaSO_4$ (gypsum), will contain 420 grams of solids per liter or 3.5 pounds per gallon. The same product may be made by dissolving the alum first, then adding the calcium chloride and sodium carbonate in sequence or by dissolving the calcium chloride first and then adding the alum and sodium carbonate in sequence but a preferred procedure is to mix the alum and calcium chloride together in dry form, dissolve the mixture in water, and then add the sodium carbonate to the solution. This procedure has the advantage that dissolution of the alum-calcium chloride mixture in water causes a rise in temperature which hastens the dissolution of the alum.

The new compound or composition can be used by mixing the concentrated solution, as made, and which will be referred to as the gross product, into the liquid to be clarified. The gross product, Combination A, includes both sodium sulfate and gypsum, which latter is resuspended by stirring before the gross product is used. Or the gross product can be diluted—one part up to five parts water, and the diluted product added to the liquid to be clarified. Great dilution is not permissible where the product is to be stored, as will be discussed later. Addition of the product in somewhat diluted form is recommended when small dosage is indicated because better distribution through the liquid to be treated is obtained with this procedure. The gypsum can be filtered out but this extra step is not considered of any particular advantage where the presence of the gypsum in the precipitated sludge is not objectionable. In fact, it seems to serve as a weighting agent and promotes sedimentation, and, in treating soapy sewage it appears to assist in making a curd-like floc which settles quickly.

The gross product made from Combination A comprises a solution of aluminum chloro hydroxy sulfate, $Al_2(SO_4)Cl_2(OH)_2$; sodium sulphate, $Na_2SO_4$; and probably a little sodium chloride, NaCl. It also comprises a suspension or precipitate of calcium sulphate, $CaSO_4$. It is difficult to isolate the aluminum compound. It decomposes at temperatures over 100° C.; in fact, solutions containing it should be concentrated (under low pressure conditions) at temperatures below 95° C. Selective solvents such as alcohol and acetone have not given satisfactory separations. They tend to alter the hydroxyl and water relationships within the molecules or ions of the dissolved compound and liberate at least some of the chlorine. The aluminum compound seems to be stabilized by the sodium sulphate in concentrated solution but decomposes upon sufficient dilution to form hydrochloric acid and/or sodium chloride.

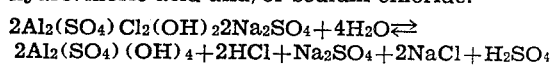

The stabilizing action of the sodium sulfate is of value where the solution containing

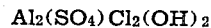

is to be stored or used in diluted condition.

The aluminum compound, $Al_2(SO_4)Cl_2(OH)_2$, can be separated from the solution in which it is made if it is made with calcium carbonate instead of sodium carbonate. Molecular weight proportions are used, for instance:

*Combination B*

| | | |
|---|---|---|
| Alum, $Al_2(SO_4)_3.18H_2O$ | pounds | 666 |
| Calcium chloride, $CaCl_2.2H_2O$ | do | 147 |
| Calcium carbonate, $CaCO_3$ | do | 100 |
| Water | gallons | 150 |

The calcium carbonate is added as powdered limestone, 200 mesh material being readily procurable at low cost and giving satisfactory results. The carbonate does not dissolve in water, of course, but it does react quickly when added to the solution resulting from the reaction of the calcium chloride with the alum. The amount of water used can vary but, preferably, as small an amount is used as will permit good mixing while the ingredients are reacting.

Combination B reacts in accordance with Equation I and as follows:

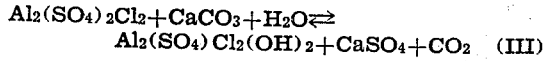

Reactions I and III both give calcium sulphate (gypsum) as a product. It can be filtered off at the completion of III, leaving solution of $Al_2(SO_4)Cl_2(OH)_2$. The solution can be concentrated by evaporation under low pressure until a paste, or even drier material, remains. Analysis shows this to have the required amount of aluminum, chlorine, and sulphate ($SO_4$) and hydroxyl (OH) radicals to form the compound corresponding to the structural formula.

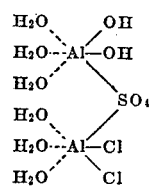

The averages of three determinations by different analysts were in percent, by weight, as given below:

|  | Theoretical | Found |
|---|---|---|
| Aluminum | 21.15 | 21.15 |
| Chlorine | 27.80 | 28.01 |
| Hydroxide | 13.35 | 13.35 |
| Sulphate | 37.70 | 35.32 |
| Totals | 100.00 | 97.83 |

This is a good check considering the compound was made with commercial materials and tap water.

The hydroxyl groups of the above formula were qualitatively determined and fitted into the structure to satisfy valence demands. As some investigators in this branch of chemistry believe dissolved aluminum becomes associated with water until a valence of six is satisfied, the water shown on the left of the structural formula is to satisfy that hypothesis. I do not claim to know with certainty the structural formula of the compound. Tests to show that the hydroxyl radical (OH) is present were made with ferric chloride. When a small amount of ferric chloride solution was added to a solution of the material comprised in the present invention, the solution was made a bright reddish brown which gradually turned to a dark brown, with precipitation, on standing. This change in the solution was considered as evidence that (OH) radicals were present permitting the chloride to change to an oxide, probably $Fe_3O_4$. It took place only when the ferric chloride was added to a solution containing hydroxylions. The product of the invention also showed the presence of hydroxyl by the readiness with which it underwent hydrolysis upon dilution or upon the addition of a dehydrating agent such as ethanol. Many of the aluminum compounds available, especially those suggested for coagulation purposes, were tested and only the one formed by the present invention gave positive reactions for the four ingredients: Aluminum, chlorine, sulphate radicals and hydroxyl radicals.

This compound can be made, stored, and effectively used only if its susceptibility to dissociation in the presence of water or dehydrating agents such as ethanol is recognized. The dissociation or alteration of character which is to be discussed is believed to constitute hydrolysis but I do not want to be held to a particular theory or definition in recording the results obtained with this product.

A solution of the product was made in accordance with Combination B. The amount of water used made a solution, after evolution of the $CO_2$ and removal of the $CaSO_4$ by filtering, containing .0587 gram of aluminum per c. c. The results noted when this solution was diluted with water are given in the table below:

| Amount of solution | Water added | Appearance, as to turbidity |
|---|---|---|
| C. c. | C. c. | |
| 10 | 10 | Clear, indefinitely. |
| 10 | 20 | Noticeable turbidity in 3½ hours. Opaque next day. |
| 10 | 30 | Opaque in 1½ hours. |
| 10 | 40 | Opaque in ¾ hour. |
| 10 | 50 | Opaque in 23 minutes. |

The turbidity is apparently caused by the hydrolysis of the product to hydrous aluminum oxide, i. e. $Al_2O_3 2H_2O$, with liberation of $H_2SO_4$ and HCl. An intermediate product, $Al_2SO_4(OH)_4$ may be formed because the chlorine seems to be displaced by hydroxyl before the sulphate radical. When a solution is allowed to hydrolyze to this intermediate condition, it is of little value as a coagulant. One of the valuable discoveries of the invention is that the product can be prevented from hydrolyzing if it is kept away from moisture as a paste, or is left in very concentrated solution; and, further, that its effectiveness as a coagulant is realized if dilution to the extent that hydrolysis takes place is not permitted until it is mixed with the liquid to be clarified.

The solution made from Combination A will retain its value even though diluted to about 1 part solution as made to 5 parts water. Such diluted solution will contain as little as .006 gram of aluminum per c. c. of solution. As stated above, the sodium sulphate present seems to stabilize it. But it is not recommended that it be diluted to this extent unless it is to be used within a few hours.

The solution made from Combination B can be diluted only about one to one and be kept for any reasonable time. If diluted so that it contains less than about .02 gram of aluminum per c. c. it should be used in a short time after dilution. But this solution of Combination B can be stabilized by adding to it an amount of sodium sulphate corresponding to that present in the solution made by Combination A. There is this difference, however. The sodium sulphate in the solution of Combination A stays in solution whereas that added to the solution of Combination B seems to gradually crystallize out. It is recommended therefore, that if a relatively weak solution is desired, especially if it is to be stored for any length of time, that it be made with Combination A.

The value of this product as a coagulant will be illustrated by results obtained at a municipal sewage treating plant where about one million gallons of sewage is treated daily. The test periods were from 6 a. m. to 6 p. m. and samples taken every 15 minutes were composited hourly from 8 a. m. to 5 p. m. A gross product made according to Combination A but with something less than one molecular weight (about 70%) of soda ash, was used in half the tests. The gross solution was diluted, about 1 to 10, with water just as it was fed into the incoming sewage. A rapidly revolving agitator gave flash mixing. An unfiltered, commercially termed "activated," alum was used in comparative tests.

| Mid-week sewage | Test 1 | Test 2 |
|---|---|---|
| Coagulant, $Al_2(SO_4)_3.18H_2O$ pounds | 475 | |
| Coagulant, $Al_2(SO_4)Cl_2(OH)_2$ do | | 455 |
| (Weight based on total solid ingredients.) | | |
| Susp. solids removed by settling per cent | 46.6 | 58.8 |
| Susp. solids removed by settling and filtering per cent | 84.6 | 86.6 |
| B. O. D. removed, settling do | 41.9 | 48.0 |
| B. O. D. removed, settling and filtering do | 60.0 | 67.7 |

| Monday sewage | Test 3 | Test 4 |
|---|---|---|
| Coagulant, alum pounds | 661 | |
| Coagulant, $Al_2(SO_4)Cl(OH)_2$ do | | 665 |
| Susp. solids removed by settling per cent | 49.5 | 65.3 |
| Susp. solids removed by settling and filtering per cent | 73.3 | 87.2 |
| B. O. D. removed, settling do | 43.4 | 59.2 |
| B. O. D. removed, settling and filtering do | 55.9 | 70.0 |

The soapy Monday sewage has always presented a difficult problem at this plant. Ferric chloride, even in excessive amounts, gave unsatisfactory results. Alum is commonly used but the amount of alum required to obtain a passable effluent entails a heavy expense. The product of the invention gave a larger, heavier floc than alum, used in equal amounts, and settling was faster and more definite. The sludge removed with the new product filtered better—after the usual treatment with ferric chloride and lime, and gave a heavier dried cake than the sludge removed with alum. The results were more definite and dependable all the way through when the product of the invention was used.

As stated above, the ingredients need not be reacted in equimolar proportions. If enough chloride and carbonate is added to the alum to change an appreciable amount of it to the product of the invention, an improvement in results is noticed that is usually worth the cost of the chloride and carbonate.

The curves in Fig. 1 of the accompanying drawing were drawn from test results obtained for the purpose of ascertaining the relationship between the amounts of ingredients used and clarification obtained in a municipal sewage. Curve 1 shows the results obtained with alum used in varying amounts. The other curves 2, 3, 4, 5 and 6 show the results obtained when the alum was reacted with ¾ mol of calcium chloride and various amounts of sodium carbonate. The results indicated by curve 2 using a 1 to .75 to .25 mixture and possibly those indicated by curve 3 using a 1 to .75 to .50 mixture may not be worth while but curve 4 shows results with a 1 to .75 to .75 mixture which are so much better than those obtained with alum that the use of such a mixture is strongly indicated. Why still more sodium carbonate gives better results, as shown in curves 5, 6 and 7, is not known. It does not seem to be due entirely to the higher pH that the corbonate imparts to the sewage.

The tests represented by the curves of Fig. 1 of the accompanying drawing were made on a sewage having a turbidity of 370 P. P. M. and a pH value of 7.0. The compositions corresponding to the curves are shown by the following table:

Ingredients:
$a = Al_2(SO_4)_3.18H_2O$
$b = CaCl_2.2H_2O$
$c = Na_2CO_3$

| Curve | Ingredients | | |
|---|---|---|---|
| | a | b | c |
| | Parts by mol. wt. | Parts by mol. wt. | Parts by mol. wt. |
| 1 | 100 | 0 | 0 |
| 2 | 100 | 75 | 25 |
| 3 | 100 | 75 | 50 |
| 4 | 100 | 75 | 75 |
| 5 | 100 | 75 | 100 |
| 6 | 100 | 75 | 125 |
| 7 | 100 | 75 | 150 |

Comparative tests were made to ascertain which of the products, that made from Combination A or that made from Combination B, gave the best results and whether it was advantageous to add them quickly, with a flash mix, or with slow stirring as is usually done with alum. The sewage used was about 18 hours old, had a pH of 6.5 and a turbidity of 210 P. P. M. The coagulants were solutions of K—Alum, $Al_2(SO_4)_3.18H_2O$ containing .0355 gram of aluminum per c. c.

M—Resulting from Equations I and II, filtered, containing .0285 gram Al per c. c.
N—Resulting from Equations I and III, filtered, containing .0286 gram Al per c. c.

Each coagulant was tested in laboratory sewage testing equipment, one test having the stirrer revolving at 15 R. P. M. throughout the flocking period of 30 minutes, the other having the stirrer revolving at approximately 200 R. P. M. for a very short time, less than one minute, as the coagulant was being added and then stirred at 15 R. P. M. for 30 minutes. After a one hour settling period, the clarification values were read. A 5 to 10 minute flocking period would have been sufficient for the hydroxy chloro sulphates but all were run for 30 minutes because the alum treated samples required that length of time for the formation of a good floc.

Results

| Curve | Coagulant initial stirring | P. P. M. of aluminum in coagulant | | | | | | |
|---|---|---|---|---|---|---|---|---|
| | | .4 | .8 | 1.7 | 3.4 | 6.8 | 10.2 | 13.6 |
| | | Remaining turbidity, parts per million | | | | | | |
| 8 | K. Slow | | 160 | 142 | 120 | 68 | 38 | <20 |
| 9 | K. Flash | | 172 | 168 | 144 | 72 | 48 | <20 |
| 10 | M. Slow | 170 | 172 | 174 | 160 | 84 | 56 | |
| 11 | M. Flash | 88 | 82 | 64 | 32 | <20 | <20 | |
| 12 | N. Slow | 140 | 120 | 100 | 72 | 70 | 36 | |
| 13 | N. Flash | 142 | 120 | 108 | 72 | 22 | <20 | |

Figure 2:
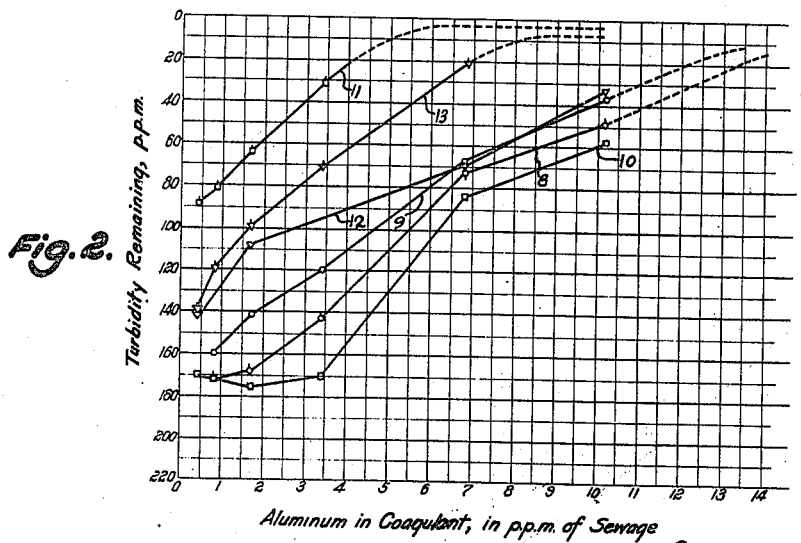

The results of these tests are shown graphically by curves in Fig. 2 of the drawing.

The following observations with reference to equivalents of the alum, calcium chloride and sodium carbonate or calcium carbonate used for making the combination are given as a guide in determining the scope of the appended claims. In the first place it is to be observed that these chemicals are relatively inexpensive as they must be for the preparation of a material to be used for sewage treatment. It appears futile to look for a cheaper source of aluminum and sulfate than alum but the use of compounds capable of supplying these ions as a substitute for the alum is not excluded.

Barium chloride and strontium chloride can be substituted for the calcium chloride used in the preparation of the composition but these compounds also are so relatively expensive that they are excluded from use from a practical standpoint. The chloride used in making the composition must apparently be one the base of which forms a relatively insoluble sulfate. Other halides of the alkaline earth metals also come into consideration as substitutes for the chlorides but are so relatively expensive that their use is not practicable. Other means of removing a sulfate group from the alum have been tried such as by the use of calcium hydroxide but equivalent results are not obtained presumably because such agents, capable of binding a sulfate group, are not capable of supplying the chlorine ion or atom to the combination. However combinations of reagents capable of removing the sulfate group and of supplying the chlorine atom are not excluded.

Bases other than sodium carbonate for supplying the hydroxyl ion have been considered and tried. While such materials have not completely failed they have not been found to be as useful or successful as sodium carbonate presumably because they do not provide the necessary pH value in the reaction mixture. In this connection it is noted that Combination A made with the 1:1:1 ratio after separation of calcium sulfate by filtration has a pH value of about 3.45.

Practically therefore the invention is confined to the use of commercial alum $Al_2(SO_4)_3.18H_2O$, calcium chloride and sodium carbonate or calcium carbonate as the reagents for the production of the composition and extensive tests indicate that the sodium carbonate or calcium carbonate must be brought into the reaction only after the alum and calcium chloride have had an opportunity to react, i. e. after one sulfate group of the alum has been replaced by chlorine.

The composition appears to be capable of uses other than as a coagulant. Such other uses however have not been investigated.

Discussion of the intermediate product $$Al_2(SO_4)_2Cl_2$$

formed by reaction of the aluminum and calcium chloride prior to the addition of sodium or calcium carbonate, has been avoided in the foregoing disclosure in order to avoid confusion in the disclosure. This intermediate product has been tested as a coagulant and while not as useful as the final product is better than alum, giving a large, quick settling floc. Like the final product it forms the floc quickly upon dilution with water and therefore requires a flash mixing with the sewage or other liquid being purified.

As between the compositions made by the use of sodium carbonate and calcium carbonate the former has been found to give slightly better results, after removal of the calcium sulfate, than the latter. No logical explanation of this difference can be given at present but it is noted that the sodium carbonate product contains sodium sulfate and remains stable at a higher dilution than the calcium carbonate product.

As has been indicated in the foregoing disclosure calcium chloride may be reacted with the alum in proportions up to 1 mol of calcium chloride to 1 mol of the alum. As a matter of fact a larger proportion of calcium chloride may be used without appreciable detrimental effect but it should not be used in such large proportion as to remove all of the second of the three sulfate groups of the alum some of which should be left for replacement by hydroxyl groups. Barium chloride acts more strongly to remove sulfate groups than calcium chloride and must be used with greater care with respect to the removal of the second sulfate group.

The sodium carbonate may be used in proportion considerably in excess of the 1 to 1 ratio and gives improved results up to a 1.5 to 1 ratio and even higher.

The calcium carbonate used in making Combination B may be used in excess without appreciable detrimental or advantageous effects.

The Combinations A and B generally are used in the purification of liquids in about the same quantities as alum is used.

As compared with alum treatment of sewage the sludge formed by the aluminum hydroxy sulfate chloride compound or composition is more compact and the floc is heavier and settles more quickly giving a clear effluent containing less putrescible matter as indicated by turbidity and B. O. D. measurements, regardless of whether the sewage is merely settled or both filtered and settled.

I claim:

1. A compound consisting of two aluminum atoms, one sulfate group, two chlorine atoms, and two hydroxyl groups.

2. A stable composition comprising water and a compound containing two atoms of aluminum, one $SO_4$ group, two chlorine atoms, and two hydroxyl groups, said composition containing sodium sulfate and having an aluminum content of at least .006 gram per cubic centimeter.

3. A composition of matter comprising an aluminum compound containing aluminum, sulfate group, chlorine and hydroxyl group in the proportions of two atoms of aluminum, one sulfate group, two chlorine atoms and two hydroxyl groups.

4. A composition as defined in claim 3 comprising an alkaline earth metal sulfate.

5. A composition as defined in claim 3 comprising an alkali metal sulfate.

6. A composition as defined in claim 3 comprising an alkali metal sulfate and an alkaline earth metal sulfate.

EDGAR A. SLAGLE.